March 12, 1963 W. W. BALWANZ 3,081,432
ELECTROMAGNETIC ENERGY MEASUREMENT APPARATUS AND METHOD
Filed April 27, 1960
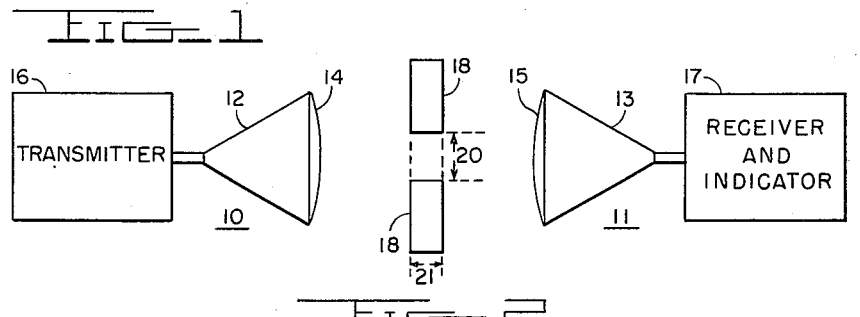
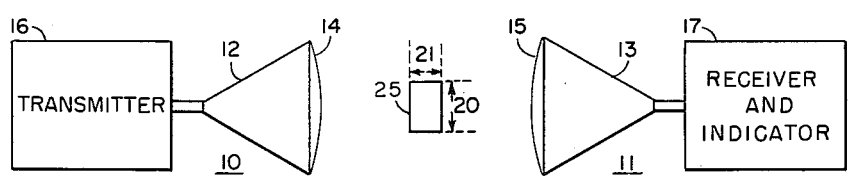
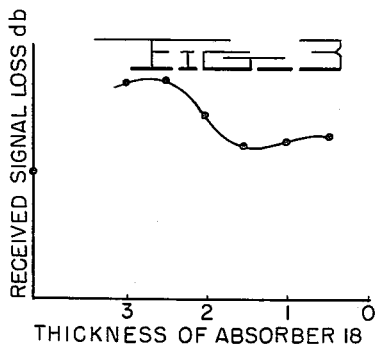
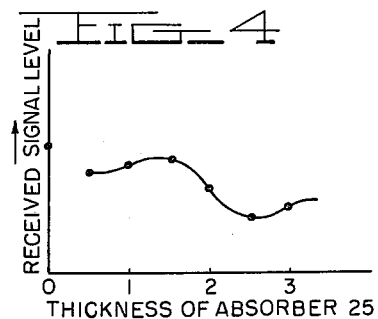
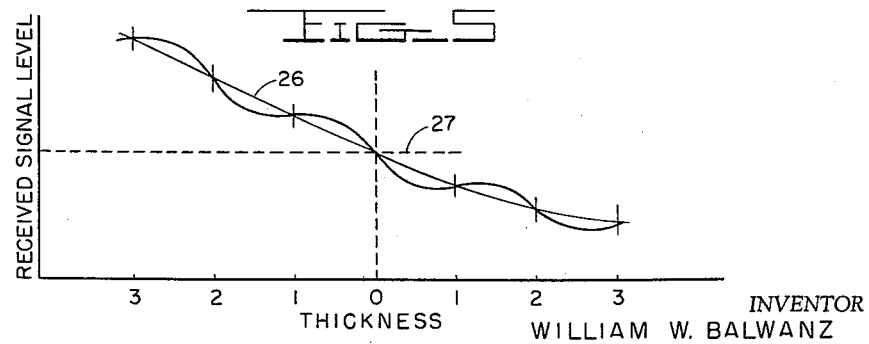
INVENTOR
WILLIAM W. BALWANZ 3,081,432
ELECTROMAGNETIC ENERGY MEASUREMENT
APPARATUS AND METHOD
William W. Balwanz, Alexandria, Va., assignor to the United States of America as represented by the Secretary of the Navy
Filed Apr. 27, 1960, Ser. No. 25,180
1 Claim. (Cl. 325—67)
(Granted under Title 35, U.S. Code (1952), sec. 266)

The invention described herein may be manufactured and used by or for the Government of the United States of America for governmental purposes without the payment of any royalties thereon or therefor.

This invention relates in general to electrical energy measuring devices and in particular to devices and methods of measuring antenna patterns at such proximity to an antenna that prior measurement techniques produce substantial distortion of the antenna field pattern.

Antennas having directive properties are well known in the art as are various forms of apparatus and techniques for measuring the directivity patterns of such antennas, a simple scheme merely requiring the insertion of a probe connected to an R.F. power meter in the field of the antenna and the rotation of the antenna during R.F. excitation thereof to measure its field strength in the particular plane desired. Such measurements are normally made with considerable separation between the antenna and the probe such that the "beam" of energy from a highly directional antenna is many wavelengths in cross-sectional dimensions in the region of the probe. Under such conditions, measurement probes do little more than extract an inconsequential amount of energy from the field, the antenna remaining matched to the impedance of free space, there being no appreciable distortion of the antenna pattern by the probe.

The foregoing "normal" situation is not under consideration in the present writing, the devices and methods of the present invention being related more to situations where very unusual conditions require a determination of the radiation characteristics in such close proximity to an antenna that the measurement probe or other form of device used for measurement actually produces substantial and unavoidable distortion of the antenna field, so that the field is different with the probe in place than that existent with the probe removed. To illustrate such distortion, the operation of the well known Yagi type of antenna depends upon a distortion of the field of a simple dipole by the close proximity of parasitic elements.

As an example of a situation where it is required to measure field strength in close proximity to an antenna, the measurement of propagational characteristics in a medium of a small cross-section, such as the exhaust from a rocket, normally requires the placement of a radiating antenna at one point near the exhaust column, and the placement of a receiving antenna near an opposing point of the column. Since the column may be only a few feet in diameter, the antennas may be so close to each other that any receiving antenna will distort the radiation field of the transmitting antenna and measurements so taken become more a function of the distortion producing characteristics of the receiving antenna than of the pattern of the transmitting antenna.

Accordingly, it is an object of the present invention to provide a method of determining antenna radiation in proximity to the antenna in which field distortion produced by the measurement apparatus can be eliminated from the result.

Another object of the present invention is to provide a method of determining antenna radiation in proximity to an antenna wherein measurements are taken under purposefully distorted conditions and then extrapolated to distortion free conditions.

Another object of the present invention is to provide a method and apparatus for measuring electromagnetic fields and antenna patterns in the near zone of an antenna system.

Another object of the present invention is to provide a method and apparatus for determining a cross-section of an electromagnetic energy antenna pattern.

Other objects and many of the attendant advantages of this invention will be readily appreciated as the same becomes better understood by reference to the following detailed description when considered in connection with the accompanying drawings wherein:

FIG. 1 of the drawing shows apparatus for producing a receivable beam of electromagnetic energy wherein distortion of the outer portions of the beam cross-section is produced in measurable amounts.

FIG. 2 of the drawing shows an arrangement of the apparatus of FIG. 1 wherein the central portion of the cross-section of the beam of FIG. 1 is distorted also in controllable and measurable amounts.

FIG. 3 shows a typical plot of signal transmission characteristics for the apparatus of FIG. 1.

FIG. 4 shows a typical plot of signal transmission characteristics for the apparatus of FIG. 2.

FIG. 5 shows the result of combining the plots of FIGS. 3 and 4.

When a beam of electromagnetic energy passes through a partial absorber such as a layer of resistive material, the beam is subjected to localized refraction which is more or less complementary at the two surfaces of the absorber such that the beam is not deflected to any appreciable extent. On the other hand, when the same beam is directed in such a manner that part of it passes through the absorber and part of it passes to one side of the absorber, the combination of various factors such as propagation velocity alteration in the absorber as well as partial attenuation can alter the direction of propagation of the beam. The magnitude of such alteration depends on the characteristics of the absorber but in general it is entirely possible to have an absorber which produces a bending of the beam toward the absorber. Thus a beam of energy which in the absence of the absorber would substantially all fall on a prearranged receiving area would no longer so fall after the partial interposition of absorptive material, part of the energy being absorbed, while the balance would be so altered in direction of travel as to at least partially fall outside of the prearranged receiving area.

In general the amount of "bending" of a beam of radio frequency energy is dependent upon the thickness of the absorber, other factors such as effectiveness of a unit thickness being held constant. Thus the direction in which the present invention is heading may begin to appear, namely the measurement of energy reaching a prearranged receiving area combined with thickness variation of an absorber disposed in such location relative to a beam of energy traveling to the receiving area as to partially intercept the beam. By such measurements for various thicknesses of absorptive material it is thus possible to derive a relationship which by extrapolation can be extended to derive the transmission characteristics for zero thickness of absorptive material. By adjusting the extent of the absorptive material transverse to the beam it thus becomes possible to determine the location of a region through which the beam passes, and therefore for a tightly focused beam, namely one having a small cross-section, the effective pattern of the radiator.

As a practical matter the foregoing is extended by making two sets of measurements, one in which the beam is caused to pass through an open space in the absorptive material, the other wherein the beam is caused to pass through a portion of absorptive material transversely centered at the beam center, and extrapolating both to a coincident value for zero thickness of absorber material.

With reference now to FIG. 1 of the drawings, the apparatus shown therein contains two antenna devices 10 and 11 which are disposed in proximity to each other so as to typically measure propagational characteristics of the space between them, which typically could contain a cylindrical fluid stream such as the exhaust from a rocket or a jet engine of an aircraft. For measurement of propagational characteristics in such a media it is desirable to direct a small diameter beam of electromagnetic energy through the fluid stream at various transverse portions thereof from one side to the other to measure attenuation, defocusing, and other differences such a stream may provide relative to normal electromagnetic wave propagation through air. Such measurement requires a knowledge of the normal path followed by substantially all of the energy (say 90%) as it travels from one antenna to the other. Such knowledge is obtained with the apparatus of FIG. 1 by inserting a mass of absorptive material 18 between the two antennas 10 and 11, such absorptive material 18 being in the form of two parallel batts having a spacing 20 and a thickness 21. The batts 18 are moved closer together or spaced further apart so as to determine the magnitude of the dimension 20 through which substantially all, say 90%, of the energy from antenna 10 passes in reaching antenna 11.

The complete apparatus of FIG. 1 further includes a horn member 12 in antenna 10 as well as a lens 14 and a transmitter 16, the latter for providing electromagnetic energy at a frequency desired for measurement purposes, and horn 13, lens 15 and receiver and indicator 17 for antenna 11 to provide for pickup of the radiated energy from antenna 10. The arrangement of the various devices of FIG. 1 is such that substantially all of the energy emitted by antenna 10 is so tightly focused as to be picked up by antenna 11 when the antennas are operative in air without the interposition of absorptive material and spaced several feet apart.

Operation of the apparatus of FIG. 1 would thus envision the making of a plurality of transmission determinations, one without absorptive material between the antennas 10 and 11 and other series of measurements with various dimensions for the spacing 20 and the thickness 21 of the absorptive material.

The apparatus of FIG. 2 corresponds in large part to that of FIG. 1 the primary difference being that of the arrangement of the absorptive material, numbered 25 in this instance, which is placed in such a position as to occupy the center of the path for the beam of energy passing from antenna 10 to antenna 11. The absorptive material 25 is like the portions of absorptive material 18 which is a batt having dimensions which can be readily varied by the insertion of batts of different dimensions. Typically the width of the batt identified by the numeral 21 would be subjected to variation by substitution of batts of different dimensions.

When the results obtained with the apparatus of FIG. 1 are plotted as shown in FIG. 3 where the received signal loss in db is one ordinate and the thickness of the absorber 18 is the other ordinate, a loss variation of a cyclic nature is indicated which may typically be plotted for various thicknesses of absorber 18 in half inch increments up to a 3 inch thickness. The results obtained with the apparatus of FIG. 1 are sufficient for establishing the antenna pattern. Greater reliability with fewer measurements is established by combining the results of measurements with the apparatus of FIG. 1 with the results of measurements with the apparatus of FIG. 2, since the region of zero thickness is produced by measurements both sides of the zero point.

The showing of FIG. 4 is a plot of transmission characteristics with the apparatus of FIG. 2 for various thicknesses of the absorber 25. The plot here is to somewhat different coordinates from those of the previous FIG. 3, the thickness of the absorber in inches being plotted against the inverse of the signal loss expressed in db. Such a plot requires the transformation of the measured data wherein the measured data expressed as a fraction of the total energy is subtracted from unit, the measured db figure being converted to the power level, and subtracted from the total energy passing between transmitter and receiver and then reconverted back to db.

When the two graphical representations of FIG. 3 and FIG. 4 are brought together with the zero value of the thickness of the absorber in coincidence as shown in FIG. 5 the more or less cyclic variations of the presentations of FIG. 3 and FIG. 4 can be connected to provide a continuous curve intersecting the received signal level axis at a value indicated by the numeral 27. The resulting cyclic curve can then be converted to a smooth curve indicated by the reference character 26. The result of this operation is an extrapolation of the curves of FIG. 3 and FIG. 4 beyond the practical minimum thickness of approximately one half inch of the absorptive material to a zero thickness of the absorber 18, 25 from which is obtained the value of the energy passing through the area between the two portions of the absorber 18 and through the area of the absorber 25. By changing the value of the dimension 20 for FIG. 1 and FIG. 2 it is thus possible to determine the region through which the beam passes with various intensity. With this method, the energy through any given area, at any distance from an antenna can be measured. Thus the spatial distribution of energy density in the antenna beam can be evaluated in both near and far zones. In normal usage the method would be applied primarily to the near zone regions, the less sophisticated probe techniques currently in use being adequate for most for zone studies.

The method is not critical of the material or the aperture configuration of the batts used in establishing the interference pattern.

Obviously many modications and variations of the present invention are possible in the light of the above teachings. It is therefore to be understood that within the scope of the appended claim the invention may be practiced otherwise than as specifically described.

What is claimed is:

In combination, means for transmitting energy through a selected path having a finite cross section, means for receiving energy after passage thereof through the selected path, a plurality of absorption means of first configuration having greater absorption in a central area smaller than the cross section of the selected path than in the outer area of the path and different effective thicknesses, a plurality of absorption means of second configuration having less absorption in a central area smaller than the cross section of the selected path than in the outer area of the path and different effective thicknesses and means for supporting individual absorption means between the first and second means in the selected path with the central area substantially centered on the selected path whereby the energy attenuation produced by the various thicknesses of absorption means in passage through the selected path is measurable by the receiver means for extrapolation to zero thickness of absorption means.

References Cited in the file of this patent

UNITED STATES PATENTS

| | | |
|---|---|---|
| 2,142,648 | Linder | Jan. 3, 1939 |
| 2,489,908 | Larrick | Nov. 29, 1949 |
| 2,892,191 | Hogg | June 23, 1959 |